United States Patent
Liow et al.

(10) Patent No.: US 7,454,663 B2
(45) Date of Patent: Nov. 18, 2008

(54) METHOD AND CIRCUITRY FOR DEBUGGING/UPDATING ROM

(75) Inventors: Stanley Liow, Hsin-Tien (TW); Kobe Chou, Hsin-Tien (TW); Vincent Lin, Hsin-Tien (TW)

(73) Assignee: Tian Holdings, LLC, Wilmington, DE (US)

( * ) Notice: Subject to any disclaimer, the term of this patent is extended or adjusted under 35 U.S.C. 154(b) by 528 days.

(21) Appl. No.: 10/973,864

(22) Filed: Oct. 25, 2004

(65) Prior Publication Data

US 2005/0102577 A1  May 12, 2005

Related U.S. Application Data

(60) Provisional application No. 60/516,240, filed on Oct. 31, 2003.

(30) Foreign Application Priority Data

May 25, 2004  (TW) .............. 93114699 A

(51) Int. Cl.
*G06F 11/00* (2006.01)
(52) U.S. Cl. .................... 714/42; 711/102
(58) Field of Classification Search .......... 714/37, 714/42, 47, 54, 30, 718; 711/102, 104
See application file for complete search history.

(56) References Cited

U.S. PATENT DOCUMENTS

| | | | | |
|---|---|---|---|---|
| 3,588,835 A * | 6/1971 | Ensbelt | ........................ | 710/46 |
| 5,592,613 A * | 1/1997 | Miyazawa et al. | ............. | 714/6 |
| 5,953,530 A * | 9/1999 | Rishi et al. | .................. | 717/127 |
| 6,915,416 B2 * | 7/2005 | Deng et al. | ................. | 712/227 |
| 2001/0052114 A1* | 12/2001 | Koh et al. | ...................... | 717/4 |
| 2002/0174385 A1* | 11/2002 | Cofler et al. | .................. | 714/38 |

FOREIGN PATENT DOCUMENTS

| | | |
|---|---|---|
| JP | 2001-265620 | 9/2001 |
| JP | 2002-007156 | 1/2002 |

* cited by examiner

*Primary Examiner*—Dieu-Minh Le
(74) *Attorney, Agent, or Firm*—Perkins Coie LLP

(57) ABSTRACT

A read only memory circuit for debugging and updating, the circuit includes read only memory, debug program memory, program counter, and compare and load unit. In the circuit, the compare and load unit detects instruction-read-memory-address from the program counter. If the instruction-read-memory-address is a predetermined main program address, the compare and load unit serves to transmit a debug address in the debug program memory to the program counter to update the original instruction-read-memory-address for debugging.

20 Claims, 2 Drawing Sheets

METHOD AND CIRCUITRY FOR DEBUGGING/UPDATING ROM

CROSS-REFERENCE TO RELATED APPLICATION

This application claims the priority benefits of U.S. provisional application titled "A NEW CHIP DESIGN" filed on Oct. 31, 2003, Ser. No. 60/516,240. All disclosure of this application is incorporated herein by reference. This application also claims the priority benefit of Taiwan application serial no. 93114699, filed on May 25, 2004.

BACKGROUND OF THE INVENTION

1. Field of the Invention

The present invention relates to a Read Only Memory (ROM) circuit, and more particularly, to a ROM circuit being subject to debugging/updating and a method thereof.

2. Description of Related Art

In a microprocessor system, a memory unit can be generally classified into two major categories: random access memory (RAM) and read only memory (ROM). A RAM is versatile, i.e. when supplying power is off, the data stored in the RAM is diminished, and thus a RAM is multi-writable. Yet a ROM is non-versatile, i.e. data stored therein stays even when supplying power is off, therefore suitable for storing BOOT program or BIOS code of a computer system. Since a ROM is non-versatile, the data therein cannot be modified once data is written. Therefore, modification of program/data stored in the ROM is hardly performed even a ROM is defective. Besides, data stored in ROM cannot be subjected to debugging or updating.

Electronic products, such as Erasable and Programmable ROM (EPROM), Electrically Erasable and Programmable ROM (EEPROM) and flash memory, serve limited modifying/updating flexibility, yet specific equipment or geometrical disposition is required to perform modifying/updating of program/data. Therefore, application scope of which is limited. For example, for a ROM of a Digital Signal Processor (DSP), it is not possible to debug/update the stored data with UV irradiation.

SUMMARY OF THE INVENTION

In the light of the above descriptions, the present invention is directed to a Read Only Memory (ROM) circuit that can be subjected to debugging/updating. A Debug Program Memory (DPM), usually is a Random Access Memory (RAM), is disposed with a ROM therein, which stores a program to update the ROM. When a Program Counter (PC) reads one of predetermined main program addresses from the ROM, the PC automatically replaces the read address with a predetermined debugging/updating address from the DPM. Thus, debugging/updating is implemented.

The present invention is also directed to a method for debugging/updating a ROM.

According to an embodiment of the present invention, the ROM circuit that can be subjected to debugging is suitable for at least a microprocessor system and digital signal processor. The ROM circuit comprises a ROM, a DPM, a PC and a compare-load unit. The ROM serves to store a main program, wherein at least one predetermined main program address is stored therein. The DPM serves to store at least a debug/update program, wherein at least one predetermined debug/update program address is stored therein. The PC serves to generate an instruction-read-memory-address of a next instruction to be executed. The compare and load unit is coupled to the PC. When the instruction-read-memory-address matches with one of the predetermined main program addresses, the compare-load unit sends a jump address to the PC, such that the instruction-read-memory-address sent by the PC replaces the predetermined debug/update program address upon request for performing read/debug/update of a data in the memory. The program then jumps back to the predetermined main program address after executing read step (the predetermined main program address can be either same or different from the original one).

According to an embodiment of the present invention, the compare-load unit comprises a comparator and a multiplexer. The comparator serves to receive and detect whether the instruction-read-memory-address matches with one of the break main program addresses or not, and outputs a selecting signal. The multiplexer is coupled to the comparator, for receiving and selecting the jump address corresponding to the break address detected matching by the comparator for outputting to the PC.

According to an embodiment of the present invention, the debug/update memory is an erasable memory or a random access memory (RAM). The debug/update program comprises a jump instruction, so that the microprocessor system returns to execute the main program.

According to an embodiment of the present invention, the predetermined main program addresses and the predetermined debug/update program addresses are stored in a register, and is subject to change.

According to an embodiment of the present invention, a debug method for a ROM suitable for a microprocessor system (or a digital signal processor, etc.) is provided. The debug method comprises providing a program counter (PC). The ROM of the system serves to store a main program, wherein a memory space of the ROM comprises at least one predetermined main program address, and the PC generates an instruction-read-memory-address of a next instruction to be executed by the system. First, a Debug Program Memory (DPM) is provided, wherein a memory space of the DPM comprises at least a predetermined debug/update program address. When the instruction-read-memory-address matches with one of the predetermined main program addresses, the instruction-read-memory-address generated by the PC is changed to a predetermined debug/update program address. Besides, after a section of data (e.g. program code) of the DPM is read/executed, jumping back to an address in the ROM, and continues to read/execute the content of the ROM until jumping to DPM is requested for next time.

According to the above descriptions, the ROM circuit, according to an embodiment of the present invention, is disposed with a ROM and a DPM. The DPM stores a substitute program for updating the ROM. When the PC reads one of the predetermined main program addresses stored in a memory space of the ROM, a PC replaces the usage of the read predetermined main program address by using one address stored in the DPM. Hence, a section of data (e.g. program code) located in DPM is reading/executing and replacing a section of data (e.g. program code) in the ROM (for debugging purpose) or a section of data (e.g. program code) located in DPM is inserted into the data (e.g. program code) in the ROM (for updating purpose).

DESCRIPTION OF THE EMBODIMENTS

Figure 1:
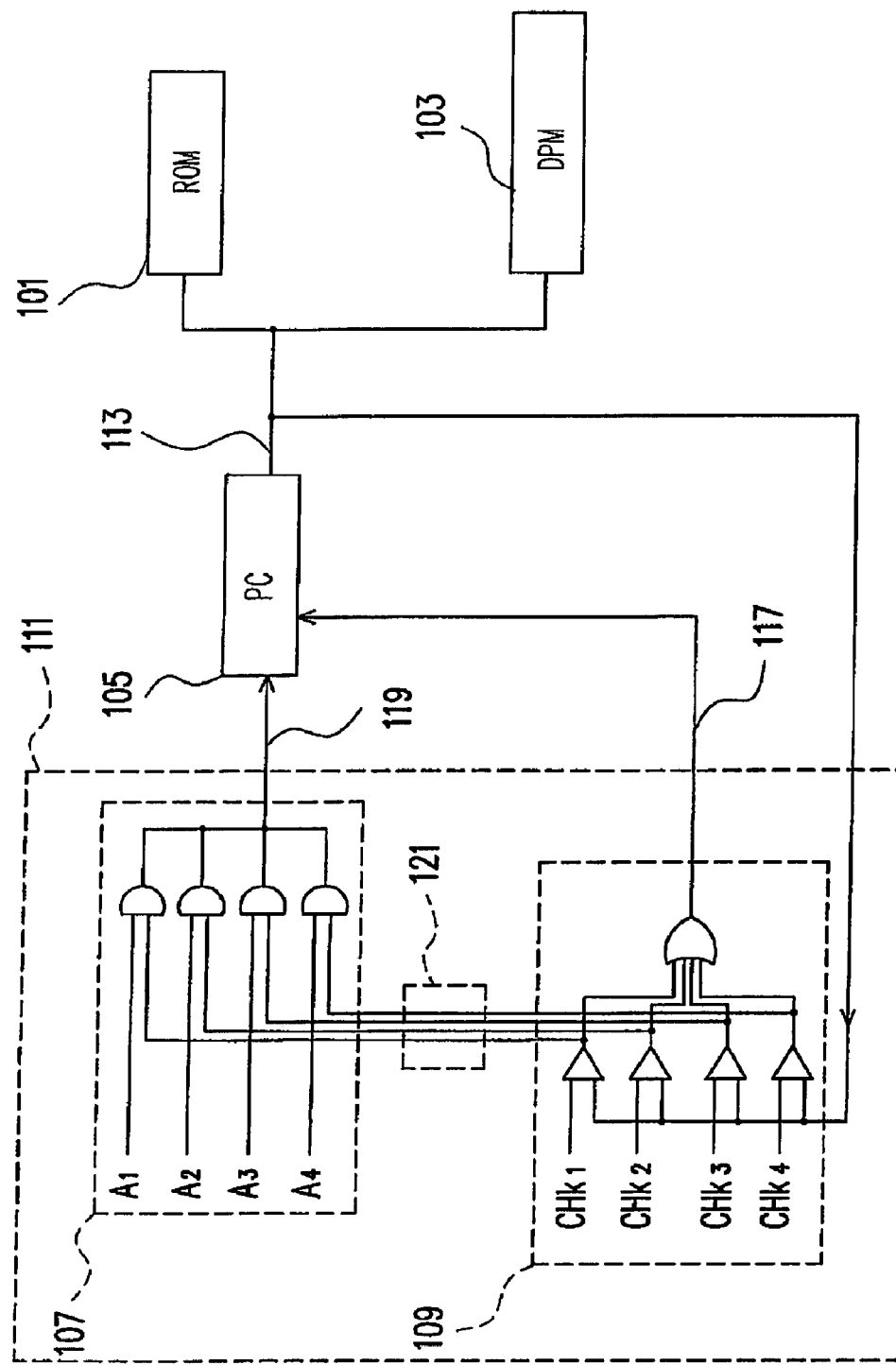
FIG. 1 is a schematic circuit diagram illustrating a debugging ROM according to one embodiment of the present invention.

Referring to FIG. 1, a block diagram of a Read Only Memory (ROM) circuit that can be subjected to debugging/updating is shown. As shown in FIG. 1, the circuit comprises a ROM 101 for storing a main program, wherein a memory space of the ROM 101 comprises at least one predetermined main program address. The debug/update memory 103 is, for example, a readable/writable memory, an erasable memory or random access memory (RAM), for storing a debug/update program, wherein a memory space of the debug program memory (DPM) 103 further comprises at least one predetermined debug/update program address. A program counter (PC) 105 is used to generate an instruction-read-memory-address for a next instruction. A compare-load unit 111 is coupled to the PC 105. When one of the instruction-read-memory-addresses matches with one of the predetermined main program addresses, the compare-load unit 111 controls the PC 105 to change the instruction-read-memory-address to another corresponding predetermined debug/update program address, so that the data/program to be read/executed is changed.

In FIG. 1, the compare-load unit 111 comprises a comparator 109 and a multiplexer 107. The comparator 109 serves to receive and detect whether there is one signal 113 of the instruction-read-memory-address matching with one of the predetermined break main program memory addresses, and outputs a selecting signal 121. The multiplexer 107 is coupled to the comparator 109 for receiving and selecting a break address corresponding to the jump address detected matching by the comparator 109 in accordance with the selecting signal 121, and outputting a break address signal 119 to the PC 105. As shown in FIG. 1, CHK1~CHK4 are four predetermined main program addresses, and $A_1$~$A_4$ are four predetermined debug/update program addresses corresponding to the predetermined main program addresses respectively. When the comparator 109 detects an instruction-read-memory-address matches one of the break main program addresses, a reset instruction 117 is sent to the PC 105 to inform the PC 105 to change the instruction-read-memory-address 113 that is to be outputted. In the embodiment of the present invention, the predetermined main program addresses CHK1~CHK4 and the predetermined debug/update program addresses $A_1$~$A_4$ are stored in a register, and are subject to change. At least one of the debug/update programs is a jump instruction for returning the ROM system to debug the main program.

Figure 2:
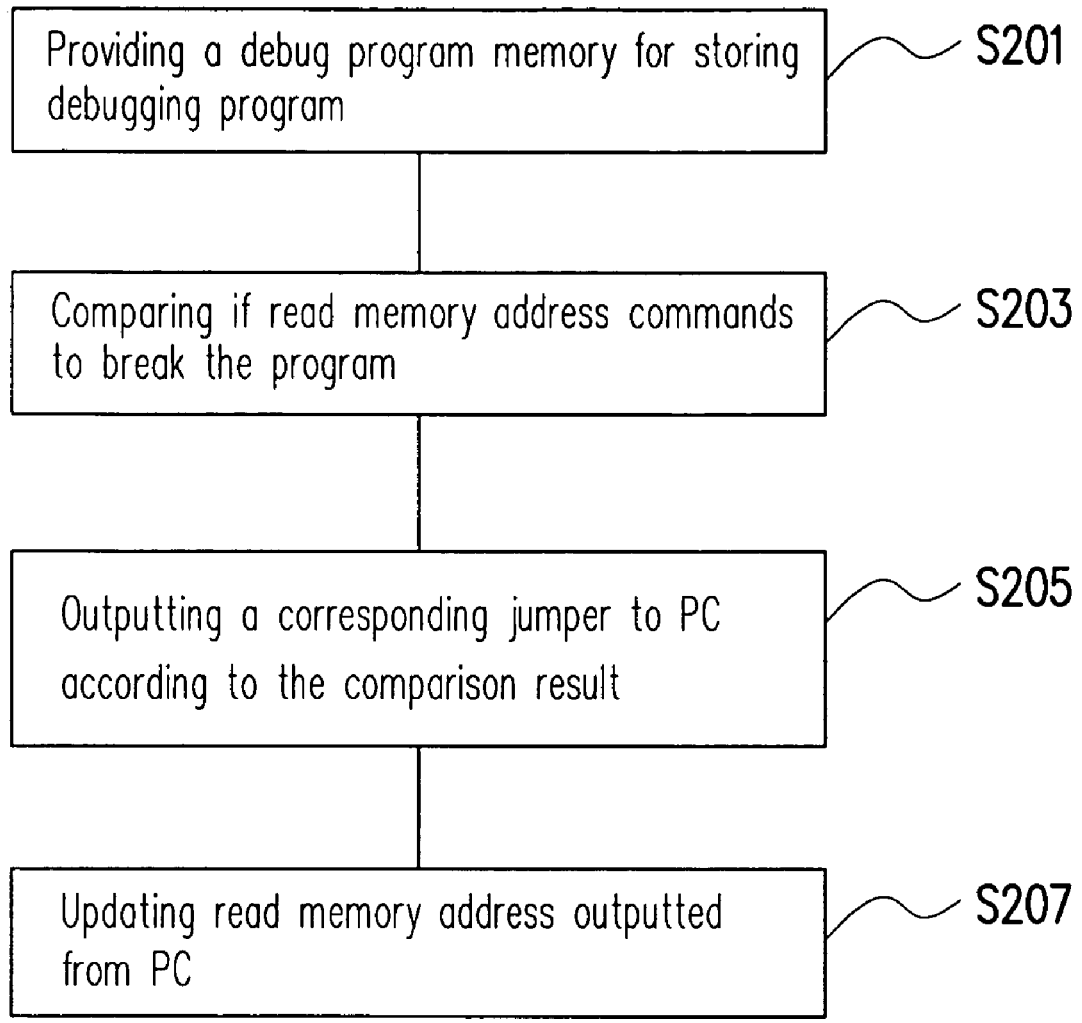
FIG. 2 is a schematic flowchart diagram illustrating a debugging method for a ROM according to one embodiment of the present invention.

Referring to FIG. 2, a flowchart diagram of a debug method for a Read Only Memory (ROM) circuit is shown. The method is suitable for a system having a Program Counter (PC), e.g., a microprocessor system or a digital signal processor. The ROM serves to store a main program, wherein a memory space of the ROM comprises at least one predetermined main address, and the PC generates an instruction-read-memory-address of a next instruction. First (at step S201), a debug program memory (DPM) for storing a debug/update program and a memory space of the DPM comprising at least one predetermined debug/update program address are provided. At step S203, whether the instruction-read-memory-address matches with one of the break main program addresses is determined. At step S205, a jump address corresponding to the break address detected matching with the instruction-read-memory address is output from the PC.

Finally, at step S207, a reset command signal is sent to the PC to inform the PC to change the instruction-read-memory-address.

According to the above descriptions, the ROM circuit for debugging/updating ROM, according to an embodiment of the present invention, comprises a ROM and a DPM. The DPM stores a substitute program to debug/update a memory. When the PC reads a predetermined main program address from a memory space of the ROM, the PC automatically changes the read address to a predetermined debug/update program address in a memory space of the DPM, so as to debug.

For example, M break main program addresses ($A_1 \ldots A_m$) are stored in the ROM, and N predetermined debug/update program addresses ($B_1 \ldots B_n$) are stored in the DPM, where M and N are integers. Each of the break main program addresses corresponds to a predetermined debug/update program address to jump to, and each of the predetermined debug/update program addresses corresponds to a break main program address to jump back to, where correspondence between break and jump is independent and subject to modification. Therefore, during the process of system read/execution ROM, it is possible to introduce a data/program that is not originally stored in the ROM, which is versatile as opposed to that stored in ROM (especially ROM integrated into the system). For example, providing a section of a program is located between $A_k$ and $A_{k+1}$, and an output $Q_1$ is generated after executing the program. When $Q_1$ is correct, the program can be run as executing the program up to $A_k$, break from $B_p$ and jump back to $B_p$ for correctly executing the program. Whereas, when $Q_1$ is incorrect, the program can be run as executing the program up to $A_k$, break from $B_p$ and reading/executing corresponding debug/update program between $B_p$ and $B_{p+1}$, and from which another output $Q_2$ is generated, then jumping back to $A_{k+1}$. As long as $Q_2$ is correct, the program section between $B_p$ and $B_{p+1}$ replaces the erroneous program between $A_k$ and $A_{k+1}$, and thus the program is debugged. Another example is, when the ROM stores a variety of programs, correspondence between M break main program addresses ($A_1 \ldots A_m$) and N predetermined debug/update program addresses ($B_1 \ldots B_n$) is modified for merely executing a portion of the program. For example, executing from $A_h$ to $B_i$ then jumping back to $A_{h+1}$ for skipping program code between $A_h$ and $A_{h+1}$. Another example is as follows. When a new program section is to be added to the program stored in the ROM, the new program section is first stored between $B_q$ and $B_{q+1}$ such that $A_h$ correspondingly jumps to $B_q$ and $B_{q+1}$ and correspondingly jumps back to $A_{h+1}$. The new program section is thus equivalently inserted after $A_h$. Therefore, as long as $A_h$ is properly chosen, a new program is added to the program stored in the ROM.

Obviously, as long as the DPM is a readable memory, the present invention can be implemented with simple hardware, which does not substantially change ROM structure. Besides, by modifying the content of the DPM, the circuit and method in the present invention manages to debug/update the ROM with the data stored in DPM (e.g. a program code) with ease.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

What is claimed is:

1. A read only memory (ROM) circuit, comprising:
   a ROM, wherein a memory space of the ROM comprises at least a predetermined main program address;

a debug program memory (DPM), wherein a memory space of the DPM comprises at least a predetermined debug/update program address;

a program counter (PC), for generating an instruction-read-memory-address of a next instruction; and a compare-load unit, coupled to the PC, wherein when the instruction-read-memory-addresses matches with one of the predetermined main program addresses, the compare-load unit changes the instruction-read-memory-address generated by the PC to one of the predetermined debug/update program addresses.

2. The ROM circuit as recited in claim 1, wherein the DPM comprises an erasable memory.

3. The ROM circuit as recited in claim 1, wherein the DPM comprises a random access memory (RAM).

4. The ROM circuit as recited in claim 1, wherein the predetermined main program addresses and the predetermined debug/update program addresses are stored in a register.

5. The ROM circuit as recited in claim 4, wherein the predetermined main program addresses and the predetermined debug/update program addresses are subject to change.

6. The ROM circuit as recited in claim 1, wherein any one of the predetermined main program address comprises at least a break address, and any one of the predetermined debug/update program addresses comprises at least a jump address corresponding to one of the break addresses respectively.

7. The ROM circuit as recited in claim 6, wherein the compare-load unit comprises:

a comparator, for receiving and detecting whether the instruction-read-memory-address matches with one of the break main program addresses, and outputting a selecting signal; and a multiplexer, coupled to the comparator, for receiving and selecting the jump address corresponding to the matching break address detected by the comparator in accordance with the selecting signal, and outputting to the PC.

8. The ROM circuit as recited in claim 7, wherein if the comparator detects the instruction-read-memory-address matching with one of the break main program addresses, a reset signal is sent to the PC to inform the PC to change the instruction-read-memory-address.

9. The ROM circuit as recited in claim 1, wherein the debug/update program comprises a jump instruction for returning to a main program.

10. A debug method for handling a read only memory (ROM), suitable for a system comprising a program counter (PC), where a memory space of the ROM comprises at least a predetermined main program address, and the PC generates an instruction-read-memory-address of a next instruction for the system, the debug method comprising:

providing a debug program memory (DPM), wherein a memory space of the DPM comprises at least a predetermined debug/update program address; and changing the instruction-read-memory-address generated by the PC to a predetermined debug/update program address when the instruction-read-memory-address matches with the predetermined main program address.

11. The debug method as recited in claim 10, wherein the DPM is an erasable memory.

12. The debug method as recited in claim 10, wherein the DPM is a random access memory (RAM).

13. The debug method as recited in claim 10, wherein the predetermined main program address comprises at least a break address, and the predetermined debug/update program address comprises at least a jump address corresponding to one of the break addresses.

14. The debug method as recited in claim 10, wherein when the instruction-read-memory-address matches with the predetermined main program address, the step of changing the instruction-read-memory-address generated by the PC to a predetermined debug/update program address comprises:

comparing whether the instruction-read-memory-address matches with one of the break main program addresses;

selecting the jump address corresponding to the matching break address detected in accordance with the comparing step, and outputting to the PC; and sending a reset signal to the PC to inform the PC to change the instruction-read-memory-address that is to be outputted.

15. The debug method as recited in claim 10, wherein the debug/update program comprises a jump instruction for returning to a main program.

16. The debug method as recited in claim 10, wherein the predetermined main program addresses and the predetermined debug/update program addresses are stored in a register.

17. The debug method as recited in claim 16, wherein the predetermined main program addresses and the predetermined debug/update program addresses are subject to change.

18. A computer-readable storage medium storing computer-executable instructions that, when executed, perform a method for enabling debugging of a read only memory (ROM), the method comprising:

receiving a next instruction address generated by a program counter;

determining whether the generated next instruction address is identified for debugging;

when the generated next instruction address is identified for debugging, replacing the generated address with an alternate address stored in a debug program memory so that a processor that is to execute an instruction located at the generated next instruction address instead executes an instruction stored in the alternate address.

19. The computer-readable storage medium of claim 18 wherein the next instruction address is indicative of an address of the ROM whereas the alternate address is indicative of an address of an alternate storage medium.

20. An apparatus for enabling debugging of a read only memory (ROM), comprising:

a memory means for storing a debug/update program address;

a counter means for generating an instruction-read-memory-address of a next instruction; and a comparing means coupled to the counter means for causing execution of an instruction stored at the stored debug/update program address when the generated instruction-read-memory-address is identified for debugging.

* * * * *